USO05625879A

United States Patent [19]

Tuulos

[11] Patent Number: 5,625,879
[45] Date of Patent: Apr. 29, 1997

[54] CHANNEL WAITING METHOD FOR A RADIO SYSTEM

[75] Inventor: Martti Tuulos, Tampere, Finland

[73] Assignee: Nokia Telecommunications OY, Espoo, Finland

[21] Appl. No.: 608,204

[22] Filed: Feb. 28, 1996

Related U.S. Application Data

[63] Continuation of Ser. No. 193,049, filed as PCT/FI92/00223, Aug. 3, 1992 published as WO93/03583, Feb. 18, 1993, abandoned.

[30] Foreign Application Priority Data

Aug. 8, 1991 [FI] Finland ................. 913772

[51] Int. Cl.$^6$ ................. H04G 7/22; H04G 7/38
[52] U.S. Cl. ................. 455/34.1; 455/33.1; 455/62
[58] Field of Search ................. 455/33.1, 34.1, 455/34.2, 53.1, 54.1, 54.2, 56.1, 58.1, 58.2, 62, 67.1

[56] References Cited

U.S. PATENT DOCUMENTS 4,012,597  3/1977  Lynk et al. .
4,573,207  2/1986  Smith et al. .
5,054,109  10/1991  Blackburn ................. 455/34.1
5,287,552  2/1994  Sasuta et al. ................. 455/54.2
5,355,516  10/1994  Herold et al. ................. 455/54.2

*Primary Examiner*—Reinhard J. Eisenzopf
*Assistant Examiner*—Nguyen Vo
*Attorney, Agent, or Firm*—Cushman Darby & Cushman IP Group of Pillsbury Madison & Sutro LLP

[57] ABSTRACT

A channel waiting method in a radio system, in which a plurality of base stations, mobile radio stations and a mobile services switching center which allocates radio channels to all calls in which one or more mobile stations participate and places the call in wait mode if radio channel capacity required by the call is not available. In order to avoid unnecessary reservation of radio channels and to ensure allocation of channels to all calls, the radio channel capacity available at a time is, at most, partly dependent on the waiting order of the calls, allocated to the waiting call for which the available channel capacity is the most suitable in view of the suitability value calculated for the call and when all the radio capacity required by the call is available.

6 Claims, 1 Drawing Sheet

CHANNEL WAITING METHOD FOR A RADIO SYSTEM

This is a continuation of application Ser. No. 08/193,049, filed as PCT/FI92/00223, Aug. 3, 1992 published as WO93/03583, Feb. 18, 1993.

THE FIELD OF THE INVENTION

The invention relates to a channel waiting method for a radio system, which system comprises a plurality of fixed radio stations positioned apart from one another in a geographical area covered by the radio system, mobile radio stations and a mobile services switching centre which allocates radio channels to all calls in which one or more mobile stations participate and places the call in wait mode if radio channel capacity required by the call is not available.

BACKGROUND OF THE INVENTION

In a mobile radio system, a plurality of users share the same radio channel group. In setting up a call, the system checks the rights of use of the particular subscriber and allocates thereto radio channel capacity by automatically selecting therefor an available radio channel. If the called subscriber is busy or all radio channels are busy, the system places the subscribers in wait mode until the called subscriber or the required radio channel capacity becomes available.

Traditionally, queuing of calls for radio channel capacity has been realised by establishing an individual queue for each base station of the mobile radio system. Thus, when the base stations required by a call do not have enough radio channel capacity available, the call is placed in wait mode in the queues of these base stations. This has the advantage that when a radio channel of a base station becomes available, a decision may be made immediately to allocate the radio channel to the next call in the queue of the base station. Problems emerge in connection with the known procedure when a channel becomes available at one base station but the call requires channels at one or more other base stations as well. It is then possible that the call is not the first in the queues of these other base stations. In such a case, the call must either reserve the available radio channel and continue to queue for the radio channels at the other base station, or quite simply to continue to queue also at the base station where the radio channel has become available. In both cases, the operation of the system is unsatisfactory. If a call reserves a radio channel beforehand, the radio channel is 'useless' for the whole time taken for the call to queue for the other radio channels it needs. On the other hand, if the call does not reserve the available channel immediately, it may need to wait endlessly for the moment when it is the first in all the queues simultaneously.

SUMMARY OF THE INVENTION

The object of the invention is to provide a channel waiting method by which the above problems are avoided and additional advantages are achieved as compared with prior art solutions.

This is achieved by a method according to the invention, comprising the steps of keeping all calls waiting in a common waiting pool, calculating a suitability value for each of the waiting calls each time new channel capacity becomes available, allocating, at most, partly dependent on the waiting order of the calls, the new available channel capacity to the waiting call for which the available channel capacity is the most suitable on the basis of the calculated suitability values of the calls, and when all the radio channel capacity required by the call is available.

In the method according to the invention all calls waiting for radio channel capacity in the system have a common waiting site or 'waiting pool' from which, at most, partly dependent on the queuing order, the most suitable call is selected to use capacity becoming available. The method resolves both problems of the prior art procedure: there is no need to allocate radio channel capacity beforehand, and the call is sooner or later assigned the required radio channel capacity.

This method is fairly easy to put into practice, since the system merely stores the waiting calls and calculates a simple function for them each time radio channel capacity becomes available. This simple function enables easy modification of principles of allocation of radio channel capacity to calls of different type.

Even if the channel-waiting method according to the invention has proved computationally light and easy to realise, it is most efficient to carry out both the calculation of suitability values for the calls and the selection of the most suitable call in one computation loop. In addition, the greater the number of waiting calls, the less loading the computation in the loop, as the base stations have fewer available radio channels whose suitability for the waiting calls could be tested.

BRIEF DESCRIPTION OF THE DRAWINGS

In the following, the invention will be explained in more detail by means of an embodiment with reference to the attached drawings, in which.

DETAILED DESCRIPTION OF THE INVENTION

Figure 1:
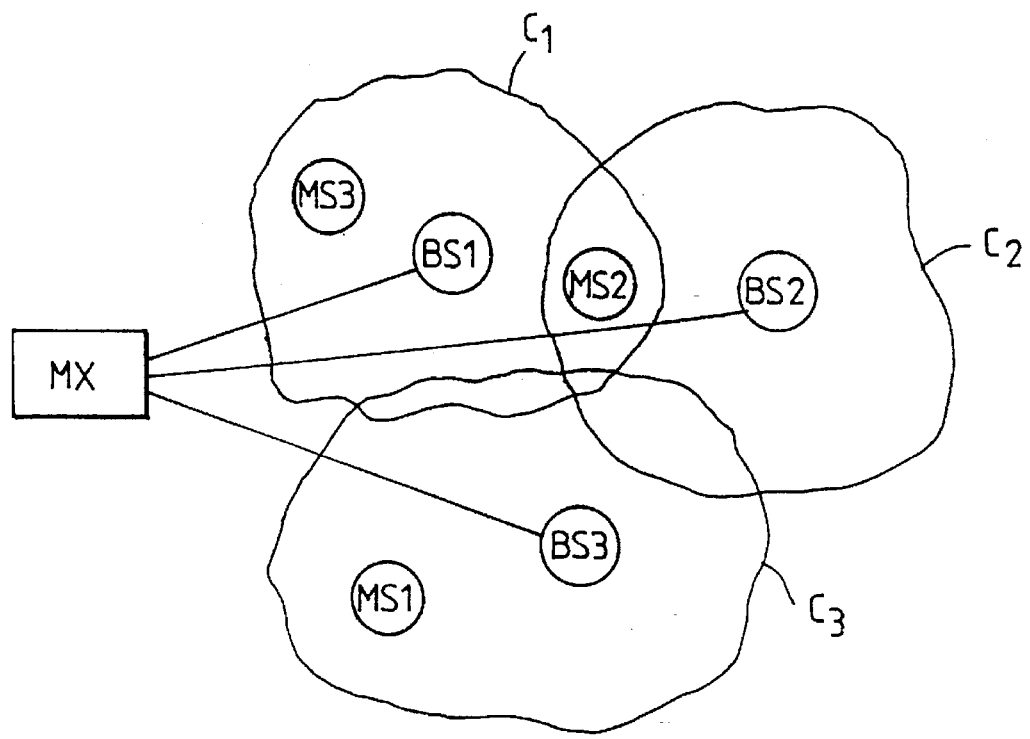
FIG. 1 illustrates one radio system in which the invention can be applied.

FIG. 1 shows a mobile telephone system in which the geographical area covered by the system is divided into smaller radio areas or radio cells C1, C2 and C3 so that adjacent cells abut each other or, preferably have overlapping peripheral areas. Each cell C1, C2 and C3 has at least one fixed multiplex transceiver equipment BS1, BS2 and BS3, called a base station herein. All the base stations BS1, BS2 and BS3 are coupled by fixed connections, such as cables, to the mobile services switching centre MX, which thus controls a plurality of base stations BS. Specific radio frequency channels have been assigned to each cell for speech or data connections so that at least neighbouring cells have different frequencies on which their base stations BS are simultaneously in radio connection with subscriber stations, i.e. mobile radios MT roaming in the cells. The radio frequency channels can further be time-shared on the TDMA principle.

Figure 2:
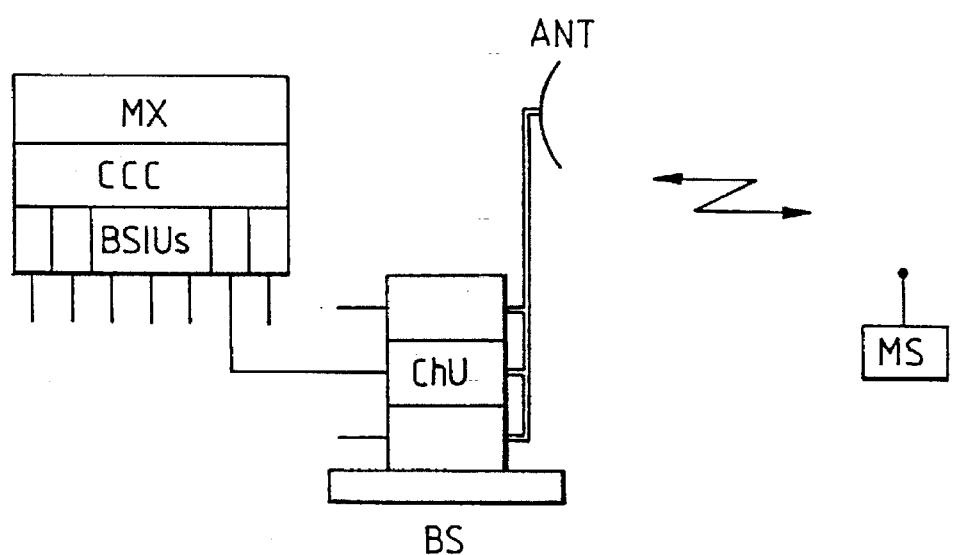
FIG. 2 illustrates the interconnection between a mobile services switching centre and a base station.

FIG. 2 illustrates the interconnection between the mobile services switching centre MX and the base station BS. The mobile services switching centre MX comprises a plurality of Base Station Interface Units BSIU, each serving as a link between the Call Control Computer CCC and the radio Channel Unit ChU of the base station. Each base station BS comprises a plurality of radio channel units ChU, each comprising a radio transceiver. The channel unit Chu can operate on one predetermined radio channel, or the mobile services switching centre MX can each time make the channel unit Chu operate on the particular desired radio channel.

An interface unit BSIU has four main tasks: to control access to its associated radio channel; to convert and forward messages between radio units, i.e. channel units ChU and the call control computer CCC; to switch speech channels of the mobile services switching centre to the radio channel; and control and monitor the operation of the base station. One BSIU controls one channel, which can be either a traffic channel or a call channel (control channel) used by the system for control signalling, such as call set-up signalling. In control channel mode, a BSIU may serve as a dedicated control channel, an undedicated control channel or a time-shared control channel. Finnish Patent Application No. 905994 describes a system in which several base stations BS1, BS2 and BS3 have a common control channel which the base stations BS1, BS2 and BS3 use on a time-shared basis for transmitting their call messages.

A BSIU can operate either in call or traffic mode. In both modes, it receives messages from the call control computer CCC, monitors the 4-wire speech and signalling connection between the centre and the base station, and transmits control data to the call control computer CCC concerning the modes of the transmitter, base station and transmission lines.

After a BSIU is connected to a traffic channel, it is either in idle state, or call mode. In idle state the BSIU waits for an allocation message from the call control computer CCC and monitors the transmission line to the base station BS. When a BSIU is allocated to a call, it turns on the transmitter of the base station BS and switches the speech channels between the base station BS and the MX in accordance with the type of the call. During the call, the BSIU transmits and receives call control messages, monitors the maintenance and releases the call in compliance with the carrier data, the call control messages from the radio path and the control from the call control computer CCC.

The call control computer CCC of the mobile services switching centre MX has to allocate radio channels, radio channel units ChU and base station interface units BSIU to each call in which one or more subscriber stations MS associated with the MX participate.

If all interface units BSIU and/or channel units ChU (radio channels) of the base station required by a specific call are busy, the system places the call in wait mode until this required radio channel capacity becomes available.

In the method according to the invention, the radio channel capacity becoming available is assigned more efficiently to waiting calls by utilising an 'unorganised' waiting site or 'waiting pool' common to all waiting calls. From this 'waiting pool' the most suitable call may be selected on a certain criterion, at most, partly dependent on the queuing order, to use the capacity becoming available. This criterion is the suitability value calculated for the call and the fact that all radio channel capacity required by the call has become available. The method resolves the problems previously related to calls requiring radio channels at two or more base stations: there is no need to allocate radio channel capacity unnecessarily beforehand, and the call is sooner or later allocated the radio channel capacity it requires.

The allocation requirements of radio channels may be formalised by the following clauses.

A call C requires a radio channel $Ch\_i$ (channel unit) and a base station interface unit $BSIU\_i$ for each mobile subscriber station $MS\_i$ ($i=1,2,\ldots,m$) participating in the call, the mobile station being capable of using base station sites $S\_ik$ ($ik=1,2,\ldots,is$), or alternatively, the call C requires a radio channel $Ch\_k$ and a base station interface unit $BSIU\_k$ at base station sites $S\_k$ ($k=1,2,\ldots,s$).

The system has to select the radio channels and BSIUs required by the call C. When the system is allocating radio channels and BSIUs to the call C and the capacity available do not suffice, the call is placed in wait mode in the 'waiting pool'.

When a radio channel or BSIU becomes available and a call X is in the waiting pool, the call X is set up if and only if:

exists X in WAITING_CALLS |
all P in WAITING_CALLS |
X>P and
S(X) > S(P)

wherein WAITING_CALLS stands for a group of calls waiting for the suitable capacity to become available in the waiting pool, and P stands for the other calls in the waiting pool. S is a real suitability function:

$$S(X)=[Pr(X)*w-W(X)+Pa(X)]*[1+G(A(X))]$$

wherein $A(X)$ is the time the call X has waited, $Pr(X)$ is the priority of the call X, $W(X)$ is the number of radio channels required by the call X, w is the maximum value of $W(X)$, and $Pa(X)$ is the number of instances in which the call X has been passed when available radio channel capacity has been allocated to waiting calls.

When all radio channel capacity required by the call X is not available, the suitability function for the call X is $S(X)=0$ (the lowest suitability value), and available capacity is not allocated to this call.

As can be seen from the above function $S(X)$, in calculation of the suitability value the priority classification of the call is weighted most, and those calls are favoured which use the smallest number of radio channels. The highest priority value Pr may be assigned e.g., to emergency calls. Owing to the factor $A(X)$, the suitability value of the call X increases with waiting time, as a result of which no call can be left waiting forever. The waiting time is evenly distributed among calls whose suitability function is otherwise the same.

The suitability function $S(X)$ can be modified from the above example by weighting different factors in a different manner and/or by inserting or deleting factors.

The attached figures and the associated description are merely intended to illustrate the present invention. In its details, the method according to the invention may vary within the scope and the spirit of the attached claims.

I claim:

1. A channel waiting method for a radio system which includes a plurality of fixed radio stations positioned apart from one another in a geographical area covered by the radio system, a plurality of mobile radio stations, and a mobile services switching centre which allocates radio channels to all calls in which one or more of said mobile stations participate and places a given call in wait mode if radio channel capacity required by said call is not available, said method comprising the steps carried out at said mobile services switching centre, of:

keeping all calls waiting in a common waiting pool;

calculating a suitability value for each of the waiting calls each time new channel capacity becomes available, the calculated suitability value of each waiting call indicating the lowest suitability when all the radio channel capacity required by said call is not available.

allocating, at most, partly dependent on the waiting order of the waiting calls, the new available channel capacity to a one of said waiting calls for which the available channel capacity is most suitable on the basis of the calculated suitability values of the waiting calls, and when all the radio channel capacity required by said one waiting call is available.

2. A method according to claim 1, wherein:

said step of calculating the suitability value is performed so that waiting time is evenly distributed among all waiting calls having the same suitability.

3. A method according to claim 1, wherein:

calculating a suitability for each of said waiting calls includes calculating when all the radio channel capacity required by each respective call has become available, a priority of each respective call, the number of radio channels required by each respective call, the elapsed waiting time of each respective call, and the number of instances in which each respective call has been allocated to waiting calls.

4. A method according to claim 3, wherein:

in calculating the respective suitability values for each of the waiting calls, the priority of each waiting call is weighted most.

5. A method according to claim 3, wherein:

in calculating the respective suitability values for each of the waiting calls, calls are favoured which use the smallest number of radio channels.

6. A method according to claim 1, wherein:

the suitability value of each call is calculated as follows:

$$S(X)=[Pr(X)*w-W(X)+Pa(X)]*[1+G(A(X))]$$

wherein S is the suitability value, X is a given waiting call, A(X) is the time the call X has waited, Pr(X) is the priority of the call X, W(X) is the number of radio channels required by the call X, w is the maximum value of W(X), and Pa(X) is the number of instances in which the call X has been passed when available radio channel capacity has been allocated to waiting calls.

* * * * *